United States Patent

Suzuki

(10) Patent No.: US 11,469,905 B2
(45) Date of Patent: Oct. 11, 2022

(54) DEVICE AND METHOD FOR PROCESSING PUBLIC KEY OF USER IN COMMUNICATION SYSTEM THAT INCLUDES A PLURALITY OF NODES

(71) Applicant: FUJITSU LIMITED, Kawasaki (JP)

(72) Inventor: Dai Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 226 days.

(21) Appl. No.: 16/668,122

(22) Filed: Oct. 30, 2019

(65) Prior Publication Data

US 2020/0177394 A1 Jun. 4, 2020

(30) Foreign Application Priority Data

Dec. 3, 2018 (JP) .............................. JP2018-226341

(51) Int. Cl.
*H04L 29/06* (2006.01)
*H04L 9/32* (2006.01)
(Continued)

(52) U.S. Cl.
CPC .............. *H04L 9/3247* (2013.01); *H04L 9/30* (2013.01); *H04L 63/101* (2013.01); *H04L 9/50* (2022.05)

(58) Field of Classification Search
CPC ....... H04L 9/3247; H04L 9/30; H04L 63/101; H04L 9/3263; H04L 9/3239;
(Continued)

(56) References Cited

U.S. PATENT DOCUMENTS 9,996,684 B2 * 6/2018 Hoyos ...................... H04L 63/10
10,984,134 B2 * 4/2021 Setty ....................... G06F 21/64
(Continued)

FOREIGN PATENT DOCUMENTS

CN 107171829 9/2017
JP 2018-81464 A 5/2018
(Continued)

OTHER PUBLICATIONS

EESR—Extended European Search Report of Corresponding European Patent Application No. 19207399.7 dated Apr. 24, 2020.
(Continued)

*Primary Examiner* — Joseph P Hirl
*Assistant Examiner* — Leynna Truvan
(74) *Attorney, Agent, or Firm* — Fujitsu Patent Center

(57) ABSTRACT

A communication method is used in a communication system that includes a plurality of nodes. Two or more authentication nodes among the plurality of nodes respectively receive account information of a user and a public key of the user from the user. The two or more authentication nodes respectively transmit a massage that indicates the account information is correct and the public key of the user to the plurality of nodes when it is decided that the account information is correct. Each of the plurality of nodes registers the public key of the user in a public key list that stores public keys of users who have been allowed to participate in the communication system, when detecting according to messages received from other nodes that a specified number of authentication nodes or more have decided that the account information is correct.

8 Claims, 15 Drawing Sheets

(51) Int. Cl.
*H04L 9/30* (2006.01)
*H04L 9/40* (2022.01)
*H04L 9/00* (2022.01)

(58) Field of Classification Search
CPC . H04L 63/0442; H04L 63/0884; H04L 63/08; H04L 2209/38; H04L 67/104
See application file for complete search history.

(56) References Cited

U.S. PATENT DOCUMENTS

| | | | | |
|---|---|---|---|---|
| 2011/0270748 | A1* | 11/2011 | Graham, III | G06Q 40/00 705/40 |
| 2012/0131350 | A1* | 5/2012 | Atherton | H04L 9/3231 713/186 |
| 2014/0344307 | A1* | 11/2014 | Nurminen | G06F 16/951 707/769 |
| 2017/0293766 | A1* | 10/2017 | Schnjakin | G06F 21/335 |
| 2018/0139056 | A1 | 5/2018 | Imai et al. | |
| 2020/0387893 | A1* | 12/2020 | Maim | H04L 9/3234 |

FOREIGN PATENT DOCUMENTS

| | | |
|---|---|---|
| JP | 2018-117287 | 7/2018 |
| WO | 2018/004783 A1 | 1/2018 |
| WO | 2018/088475 A1 | 5/2018 |

OTHER PUBLICATIONS

Conner Fromknecht et al., "A Decentralized Public Key Infrastructure with Identity Retention", IACR, International Association for Cryptologic Research, vol. 20141111:124302, Nov. 11, 2014, pp. 1-16, XP061017286. [Cited in Extended European Search Report of Corresponding European Patent Application No. 19207399.7 dated Apr. 24, 2020].

CNOA—First Office Action for corresponding Chinese patent application No. 201911126875.5 dated Oct. 26, 2021, with English translation.

CNOA—Office Action dated Mar. 14, 2022 in corresponding Chinese Patent Application No. 201911126875.5, with English translation. Please note that CN107171829 cited in the CNOA was already filed with IDS on Dec. 13, 2021.

JPOA—Japanese Office Action for Japanese Patent Application No. 2018-226341 dated May 31, 2022, with English translation. ** Non-patent document "Conner Fromknecht et al." was previously filed with IDS dated Jun. 22, 2020.

* cited by examiner

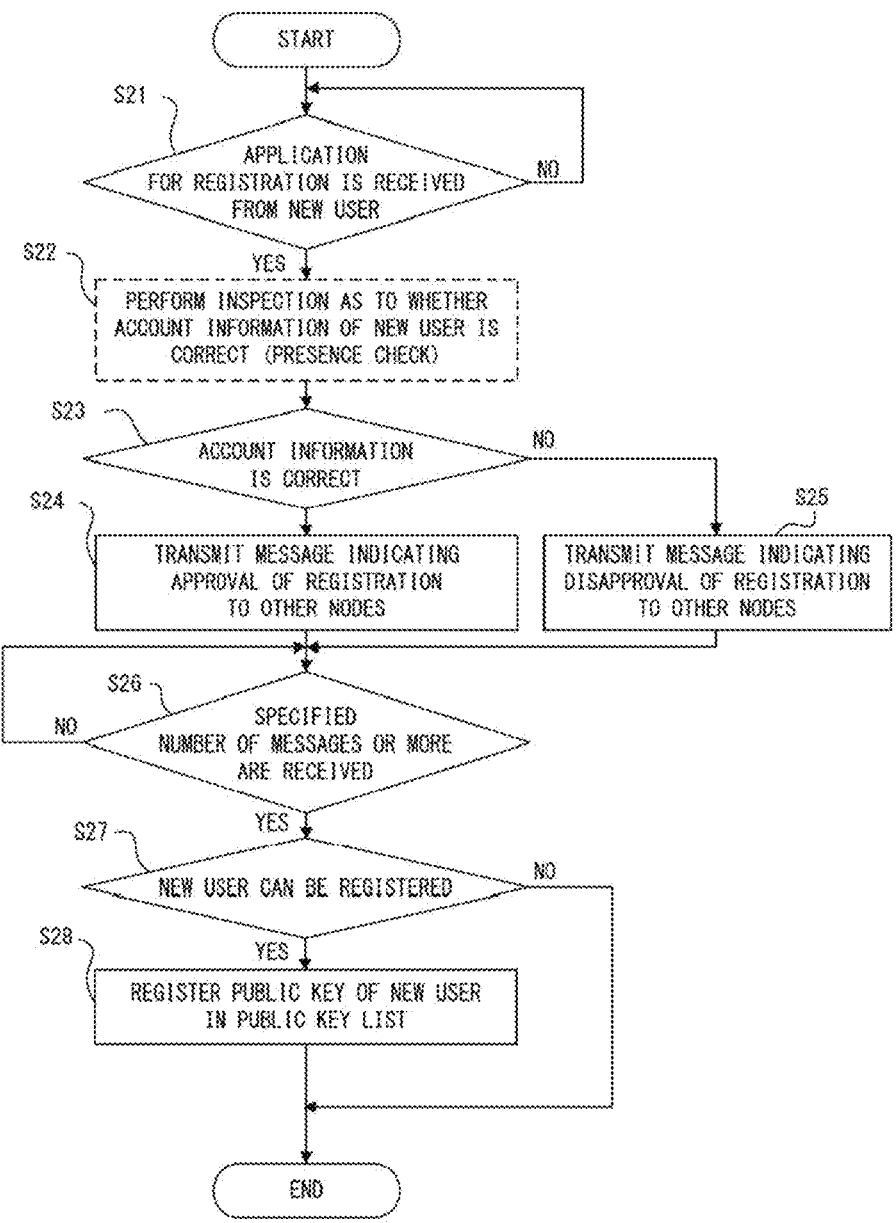
F I G. 10

DEVICE AND METHOD FOR PROCESSING PUBLIC KEY OF USER IN COMMUNICATION SYSTEM THAT INCLUDES A PLURALITY OF NODES

CROSS-REFERENCE TO RELATED APPLICATIONS

This application is based upon and claims the benefit of priority of the prior Japanese Patent Application No. 2018-226341, filed on Dec. 3, 2018, the entire contents of which are incorporated herein by reference.

FIELD

The embodiments discussed herein are related to a device and a method for processing a public key of a user in a communication system that includes a plurality of nodes.

BACKGROUND

In recent years, the block chain technique has attracted attention as a foundation for implementing virtual currencies. Applying the block chain technique to fields other than virtual currencies has been considered. For example, a focused-on case may be one in which a block chain is used to share information between companies or organizations.

Data distribution markets in which only limited users participate are known as one type of service that uses the block chain technique. A participant of the data distribution market may provide the market with data owned by him/her. The participant may acquire or purchase data that has been provided for the market. A mode in which the block chain technique is applied to a system in which only limited users participate may be referred to as a consortium block chain.

In a consortium block chain system, a participant node operated as an authentication station authenticates a user. In this situation, the authentication station authenticates the user by using, for example, an electronic certificate.

For example, a new user who wishes to participate in the system may transmit account information to the authentication station. The account information includes the name of a company to which the user belongs and contact information (e.g., address, phone number, email address). The authentication station checks whether the details of the account information are correct. In this situation, for example, the authentication station may perform the following checking tasks:
(1) Refer to the database of a third party and check whether the company is actually present.
(2) Call the main phone number of the company and check the application details of the account information.
(3) Send a mail to the company, and receive a reply from the company.

When the details of the account information are correct, the authentication station issues an electronic certificate.

A method proposed for a distributed file-sharing system is one wherein a block chain application performs user/group authentication or assures the uniqueness of contents (e.g., Japanese Laid-open Patent Publication No. 2018-081464). A technique for performing simple and rapid electronic authentication has also been proposed (e.g., International Publication Pamphlet No. WO 2018/088475).

Once a company for administering authentication stations in the Internet world loses credit, such a company will have difficulty in continuing the business. Accordingly, such authentication stations inspect users as strictly as possible.

In a consortium system in which only limited users participate, by contrast, an authentication station could easily commit an illicit behavior. For example, a malicious participant node could serve as an authentication node and issue electronic certificates.

When one of or a few of a plurality of participant nodes are operated as authentication nodes, a large load will be applied to these participant nodes. For example, the task of checking account information, such as that described above, may impose a heavy burden on the administrator for a participant node operated as an authentication station.

SUMMARY

According to an aspect of the embodiments, a communication method is used in a communication system that includes a plurality of nodes. Two or more authentication nodes among the plurality of nodes respectively receive account information of a user and a public key of the user from the user. The two or more authentication nodes respectively transmit a massage that indicates the account information is correct and the public key of the user to the plurality of nodes when it is decided that the account information is correct. Each of the plurality of nodes registers the public key of the user in a public key list that stores public keys of users who have been allowed to participate in the communication system, when detecting according to messages received from other nodes that a specified number of authentication nodes or more have decided that the account information is correct.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a flowchart indicating an example of a user registration process;

DESCRIPTION OF EMBODIMENTS

Figure 1:
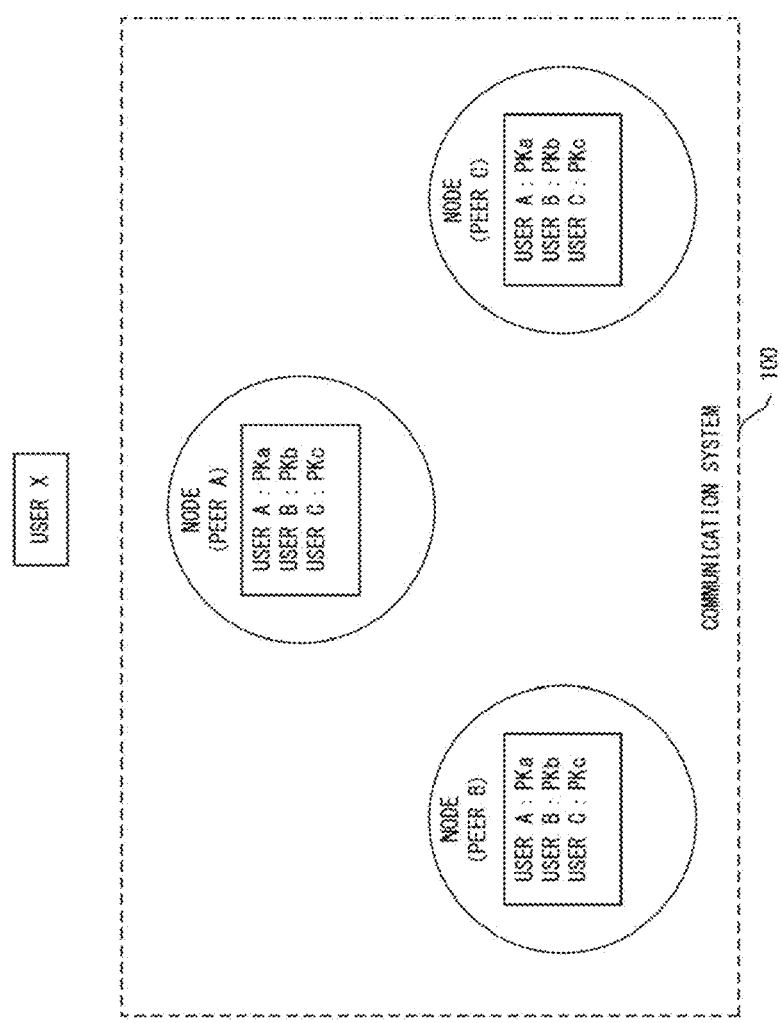
FIG. 1 illustrates an example of a communication system in accordance with embodiments of the present invention.

FIG. 1 illustrates an example of a communication system in accordance with embodiments of the present invention. In this example, a communication system 100 includes a plurality of nodes. Each node is provided with a communication device. The communication system 100 provides, for example, data distribution services. In this situation, each node is provided with a communication device for a user who has participated in the data distribution services.

Each communication device may communicate with other arbitrary communication devices. Accordingly, the communication device provided for each node may hereinafter be referred to as a "peer". In the example depicted in FIG. 1, the communication system 100 includes peers A, B, and C. The peer A is a communication device used by a user A. The peer B is a communication device used by a user B. The peer C is a communication device used by a user C.

Each of the peers A-C generates a pair of a private key and a public key to perform a cryptographic communication. In the cryptographic communication, for example, data encrypted using a private key may be decrypted using a corresponding public key. Alternatively, data encrypted using a public key may be decrypted using a corresponding private key. Accordingly, each of the peers A-C acquires the public keys of the other users in advance. Each of the peers A-C possesses a private key thereof.

Each of the peers A-C includes a public key list, as depicted in FIG. 1. A public key of a user who has been allowed to participate in the communication system 100 is registered in the public key list. Accordingly, a public key PBb of the user B and a public key PBc of the user C are registered in the public key list of the peer A. A public key PBa of the user A and the public key PBc of the user C are registered in the public key list of the peer B. The public key PBa of the user A and the public key PBb of the user B are registered in the public key list of the peer C. In the example depicted in FIG. 1, the public key of each peer is also registered in the public key list of this peer.

For example, the communication system 100 may provide data distribution services supported by a block chain. In this situation, a transaction that is requested from a user or a peer is performed after a consensus is built in the communication system 100.

A user X requests permission to participate in the services provided by the communication system 100. The communication system 100 performs a procedure for registering the user X.

Figure 2:
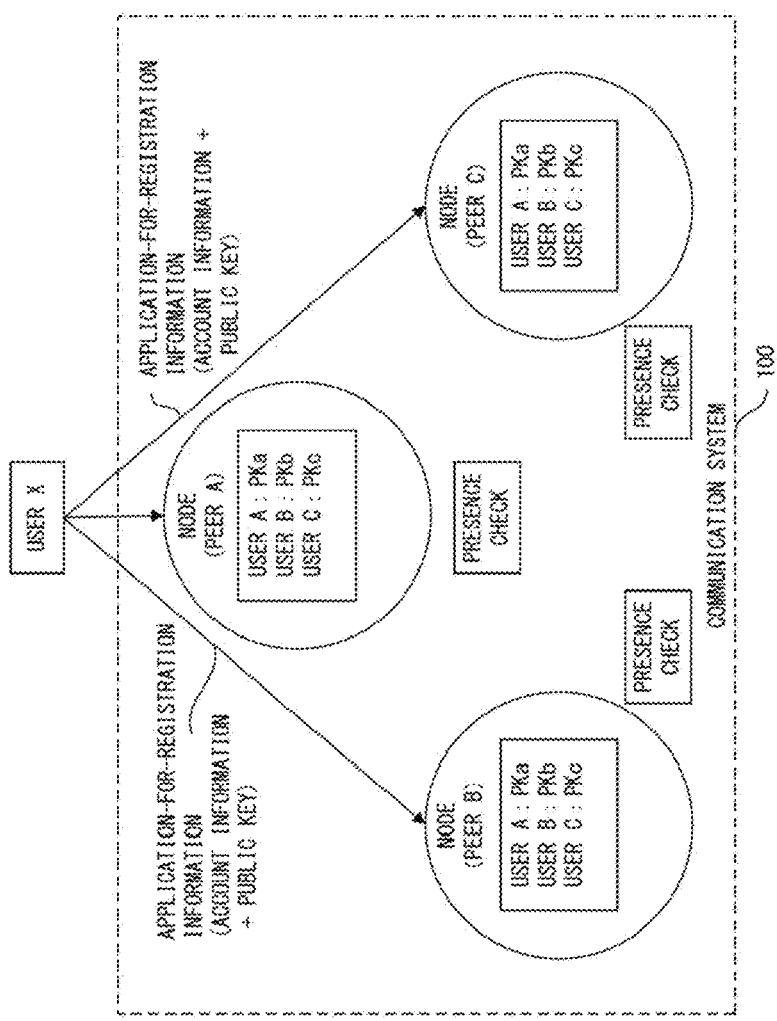
FIGS. 2-4 illustrate an example of a user registration procedure.
Figure 3:
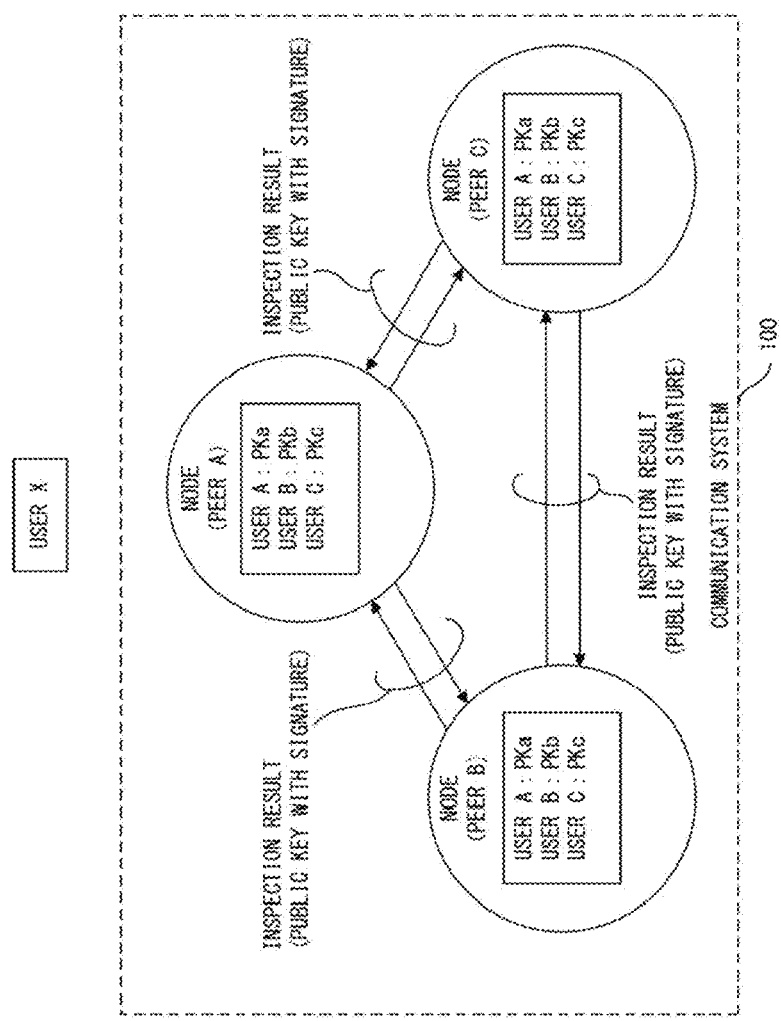
Figure 4:
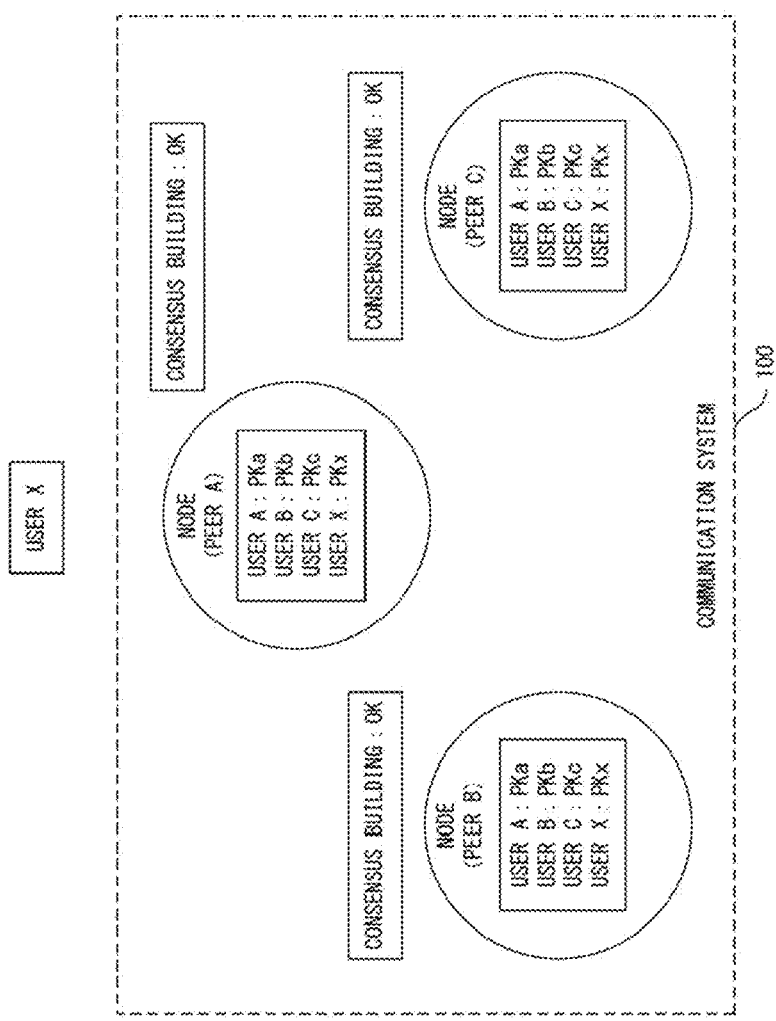

FIGS. 2-4 illustrate an example of a user registration procedure. In this example, the user X requests permission to participate in the communication system 100. "USER X" may indicate a communication device used by the user X.

The user X generates a pair of a private key and a public key to perform a cryptographic communication with peers that have participated in the communication system 100. Then, the user X keeps hold of the generated pair of a private key and a public key.

Next, as depicted in FIG. 2, the user X transmits application-for-registration information to each peer that has already participated in the communication system 100. In particular, the application-for-registration information is transmitted from the user X to each of the peers A-C. The application-for-registration information includes account information of the user X and the public key of the user X. For example, the account information may include the name of a company to which the user X belongs and contact information of the user X (e.g., address, phone number, email address).

Upon receipt of the application-for-registration information from the new user (i.e., user X), each of the peers A-C is operated as an authentication station (or an authentication node). In particular, each of the peers A-C checks whether the account information included in the received application-for-registration information is correct. Accordingly, each of the peers A-C decides according to the account information whether the user X is an authorized user. This checking task may hereinafter be referred to as a "presence check".

For example, the presence check may be performed by each of the users of the peers A-C (or by administrators of the peers A-C). In this situation, the presence check includes, for example, one or more of the following tasks:

(1) Refer to the database of a third party and check whether a company described in the account information is actually present.
(2) Call the main phone number of the company that is described in the account information and check the details described in the account information.
(3) Send a mail to the company described in the account information, and receive a reply from the company.

As depicted in FIG. 3, each of the peers A-C reports a result of the presence check (hereinafter referred to as an inspection result) to all of the other peers. In particular, each of the peers A-C transmits, to all of the other peers, a message indicating whether the account information is correct. For example, the inspection result provided by the peer A may be transmitted to the peers B and C, the inspection result provided by the peer B may be transmitted to the peers A and C, and the inspection result provided by the peer C may be transmitted to the peers A and B. The inspection results indicate whether the account information of the user X is correct.

Each of the peers A-C transmits the public key of the user X to the other peers together with the inspection result when the account information of the user X is confirmed to be correct in the presence check performed by the peer. In this situation, each of the peers A-C attaches an electronic signature to the public key of the user X. For example, the peer A may create the electronic signature by using the private key of the peer A. In particular, the peer A calculates, for example, a hash value for the public key of the user X and creates the electronic signature by encrypting the hash value with the private key of the peer A. The peer A transmits the public key of the user X to which the electronic signature has been attached to the peers B and C. Similarly, the peer B attaches an electronic signature created using the private key of the peer B to the public key of the user X and transmits the electronic signature and the public key to the peers A and C. The peer C attaches an electronic signature created using the private key of the peer C to the public key of the user X and transmits the electronic signature and the public key to the peers A and B.

Each of the peers A-C does not transmit the public key of the user X to the other peers when the account information of the user X is confirmed to be incorrect in the presence check performed by the peer. In this situation, only an inspection result indicating that the account information is incorrect is transmitted.

Each of the peers A-C performs consensus building as to whether to allow the user X to participate in the communication system 100, according to the inspection result provided by itself and the inspection results received from the other peers. For example, the peer A may decide whether to allow the user X to participate in the communication system 100, according to the inspection result provided by the node A and the inspection results received from the peers B and C.

The consensus building is performed in accordance with consensus policies determined in advance in the communication system 100. The following are examples of the consensus policies:
(1) It is decided that account information is correct when a specified number of peers or more have decided that the account information is correct.
(2) It is decided that account information is correct when the number of peers that have decided that the account information is correct accounts for at least a specified proportion of the total number of peers involved in the consensus building (e.g., majority decision).
(3) It is decided that account information is correct when all of the peers involved in the consensus building have decided that the account information is correct.

In the consensus policies 1 and 2, when counting the number of peers, the peer itself is counted. The "total number of peers involved in the consensus building" in the consensus policy 2 is a known number, and hence the specified proportion uniquely corresponds to the number of peers that have decided that account information is correct. Accordingly, the consensus policy 2 is substantially an example of the consensus policy 1. When the number of "all of the peers involved in the consensus building" in the consensus policy 3 is deemed as the "specified number" in the consensus policy 1, the policy 3 is also substantially an example of the consensus policy 1.

The following descriptions are based on the assumption that each of the peers A-C has decided that the account information of the user X is correct. Assume that each of the peers A-C uses the consensus policy 1 and the specified number in the consensus policy 1 is "2".

As depicted in FIG. 4, the peer A decides whether a consensus has been built on the user X participating in the communication system 100. In this example, all of the peers A-C have decided that the account information of the user X is correct. That is, three peers have decided that the account information of the user X is correct. Accordingly, the peer A allows the user X to participate in the communication system 100 in accordance with the consensus policy 1. Then, the peer A registers a public key PKx of the user X in the public key list of the peer A. Similarly, the peers B and C respectively register the public key PKx of the user X in the public key list thereof.

To increase the reliability of user registration, each of the peers A-C may perform an inspection as to whether the public key of the user X has been falsified. For example, as depicted in FIG. 3, the peer A receives, from the peer B, the public key PKx of the user X to which the electronic signature of the peer B has been attached. This electronic signature is created by encrypting a hash value calculated for the public key PKx with the private key of the peer B. Accordingly, by decrypting the electronic signature of the peer B with the public key of the peer B, the peer A can check that the public key PBx received from the peer B has not been falsified. Similarly, by decrypting the electronic signature of the peer C with the public key of the peer C, the peer A can check that the public key PBx received from the peer C has not been falsified. Then the peer A registers the public key PKx in the public key list thereof when the public key PBx received from the user X, the public key PBx received from the peer B, and the public key PBx received from the peer C are the same. Using a similar procedure, the peers B and C respectively register the public key PKx in the public key list thereof.

In the communication method in accordance with embodiments of the present invention, as described above, a new user is allowed to be registered according to a consensus between a plurality of peers. Hence, illicit behaviors pertaining to registration of a new user are reduced.

Figure 5:
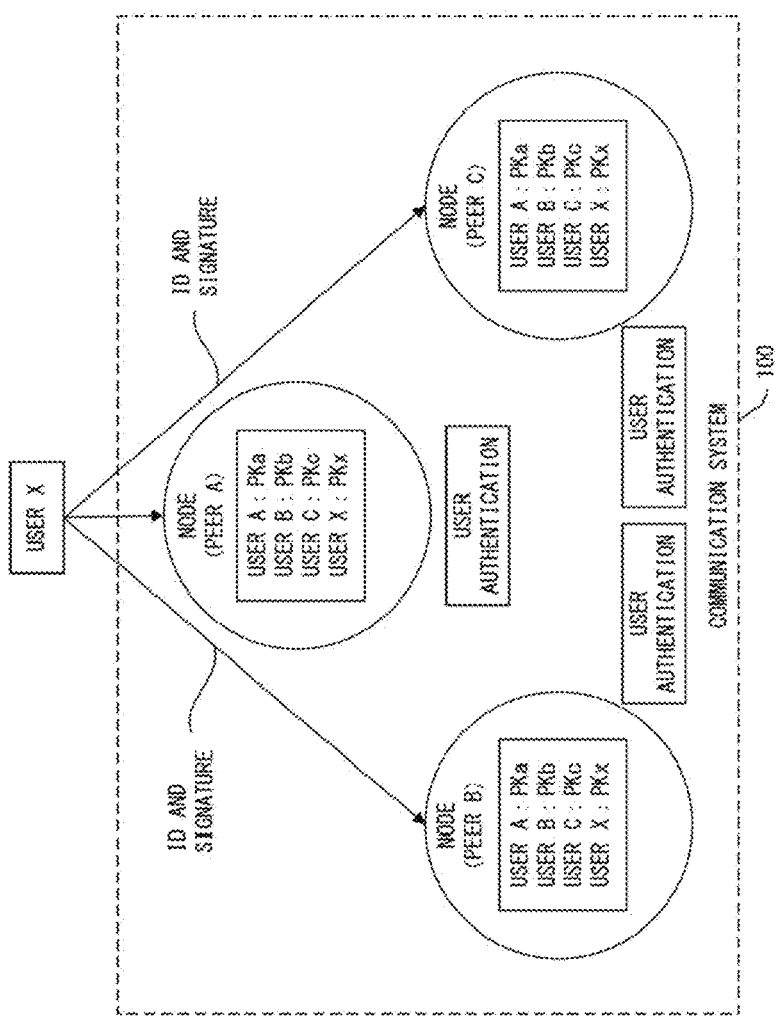
FIG. 5 illustrates an example of a user authentication procedure.

FIG. 5 illustrates an example of a user authentication procedure. In this example, the user registration procedure depicted in FIGS. 2-4 has already been completed. Accordingly, the public key PBx of the user X has been registered in the public key list of each of the peers A-C.

To perform a communication using the communication system 100, the user X needs to be authenticated by the peers of the communication system 100 (i.e., peers A-C). Accordingly, the user X transmits ID information of the user X and an electronic signature of the user X to the peers A-C. For example, the electronic signature may include a pseudorandom number and an encrypted pseudorandom number. In this situation, the pseudorandom number is generated by the user X. The encrypted pseudorandom number is generated by encrypting a hash value calculated for the pseudorandom number with the private key of the user X.

Each of the peers A-C inspects the electronic signature received from the user X. For example, the peer A may determine according to ID information received together with the electronic signature that the source of the electronic signature is the user X. Subsequently, the peer A obtains the public key PBx of the user X from the public key list of the peer A. The peer A authenticates the user X by decrypting the encrypted pseudorandom number included in the electronic signature with the public key PBx of the user X. In particular, it is determined that the user X is an authorized participant when the hash value of the pseudorandom number included in the electronic signature matches a result of decrypting the encrypted pseudorandom number included in the electronic signature with the public key PBx of the user X. Using a similar procedure, the peers B and C respectively authenticate the user X.

Figure 6:
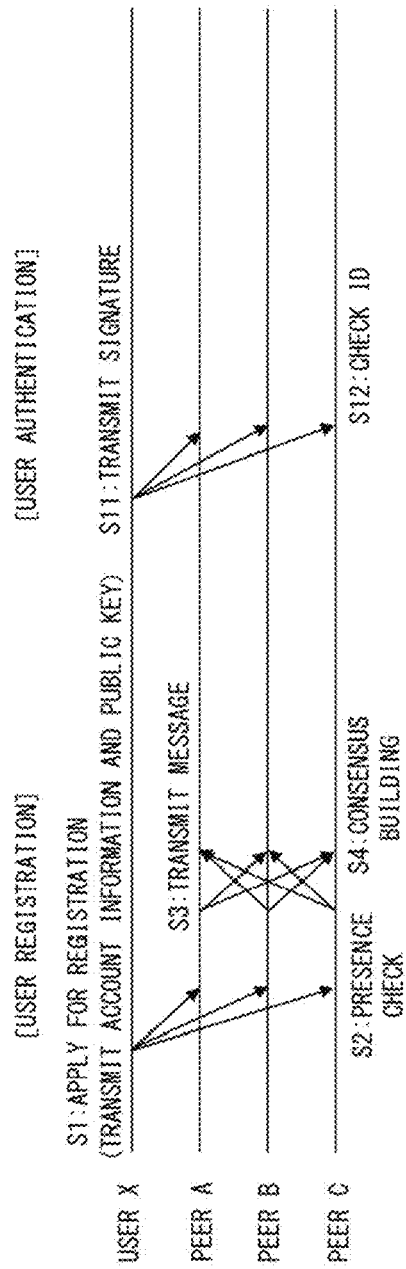
FIG. 6 illustrates an example of a sequence of user registration and user authentication.

FIG. 6 illustrates an example of a sequence of user registration and user authentication. The communication system 100 includes peers A-C, as depicted in FIG. 1.

In S1, the user X transmits application-for-registration information to the peers A-C. As described above, the application-for-registration information includes the account information of the user X and the public key of the user X.

In S2, each of the peers A-C performs a presence check for the user X. In particular, each of the peers A-C checks whether the account information received from the user X is correct.

In S3, each of the peers A-C transmits a message indicating a result of the presence check to the other peers. In this situation, each of the peers A-C may attach the electronic signature thereof to the public key of the user X and transmit these electronic signature and public key to the other peers together with the message.

In S4, each of the peers A-C decides in accordance with consensus policies determined in advance whether the account information of the user X is correct. Upon a consensus being built on the user X participating in the communication system 100, each of the peers A-C registers the public key PBx of the user X in its own public key list. Accordingly, user registration in the communication system 100 (i.e., peers A-C) is completed.

In S11, the user X creates an electronic signature by using the private key of the user X. Then, the user X transmits the created electronic signature to the peers A-C.

In S12, each of the peers A-C performs ID check of the user X by inspecting the electronic signature received from the user X. In this situation, each of the peers A-C inspects the electronic signature by using the public key PBx of the user X obtained in the user registration. In this way, the user authentication performed by each of the peers A-C is completed.

Figure 7:
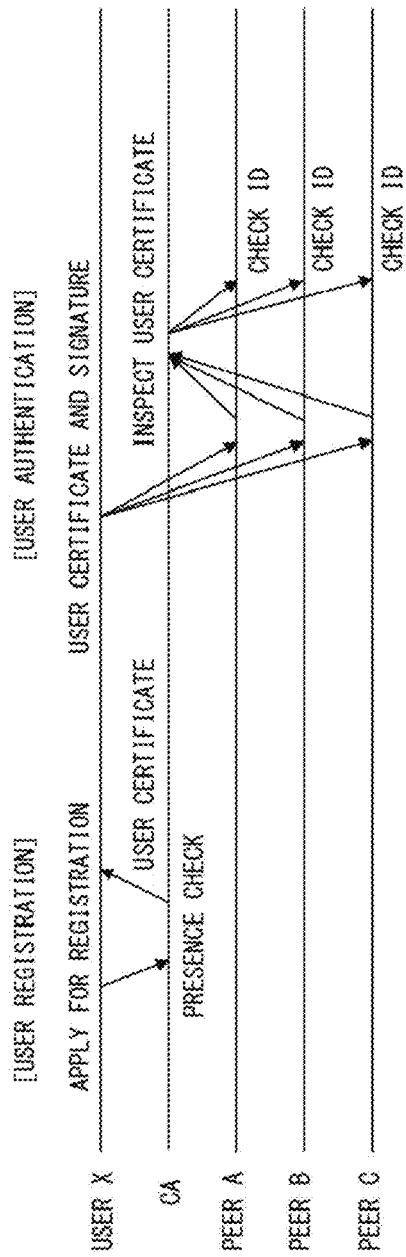
FIG. 7 illustrates an example of a sequence of user registration and user authentication that is managed by a single authentication station.

FIG. 7 illustrates an example of a sequence of user registration and user authentication that is managed by a single authentication station. In this case, a user X transmits application-for-registration information to an authentication station CA. The application-for-registration information includes account information of the user X but does not necessarily need to include the public key of the user X. The authentication station CA performs a presence check for the user X and then issues and transmits a user certificate to the user X. In a system in which user registration is managed by a single authentication station like in this example, an authentication station CA could illicitly perform user registration. In embodiments of the present invention, since user registration is performed as depicted in FIG. 6 according to a consensus between a plurality of peers, it would be difficult to illicitly perform user registration.

When user authentication is performed in the example depicted in FIG. 7, the user X transmits the user certificate issued by the authentication station CA to the peers A-C. In response to this, each of the peers A-C makes a request for the authentication station CA to inspect the user certificate. In a system in which user registration is managed by a single authentication station like in this example, a large load will be applied to an authentication station CA.

Figure 8:
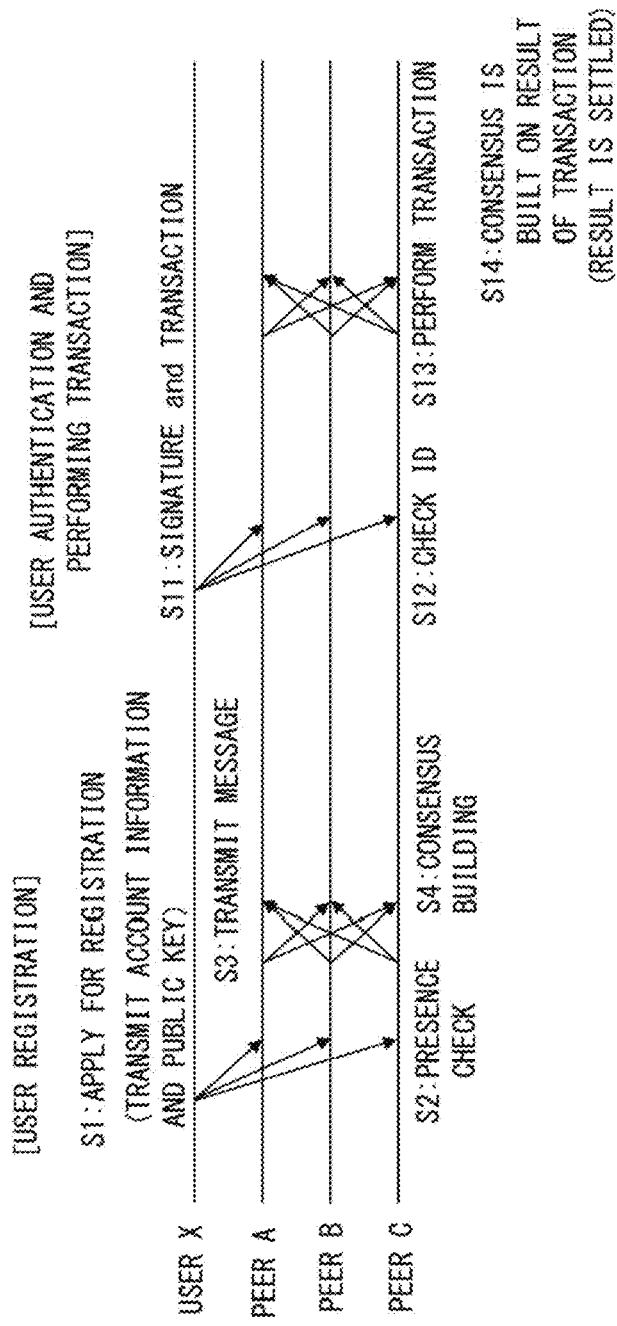
FIG. 8 illustrates an example of a sequence extending from user registration to performing a transaction.

FIG. 8 illustrates an example of a sequence extending from user registration to performing a transaction. The user registration procedure in the example of FIG. 8 is substantially the same as that in the example of FIG. 6, and descriptions thereof are omitted herein.

In S11, a user X transmits an electronic signature and a transaction to peers A-C. The transaction indicates details of a communication process to be performed.

In S12, each of the peers A-C inspects the electronic signature received from the user X. In this example, the user X has been registered by each of the peers A-C as an authorized user through S1-S4. In particular, each of the peers A-C succeeds authentication of the user X. Accordingly, in S13, each of the peers A-C performs the transaction received from the user X. When a consensus is built on a result of performing the transaction, the result of the transaction is settled in S14.

Figure 9:
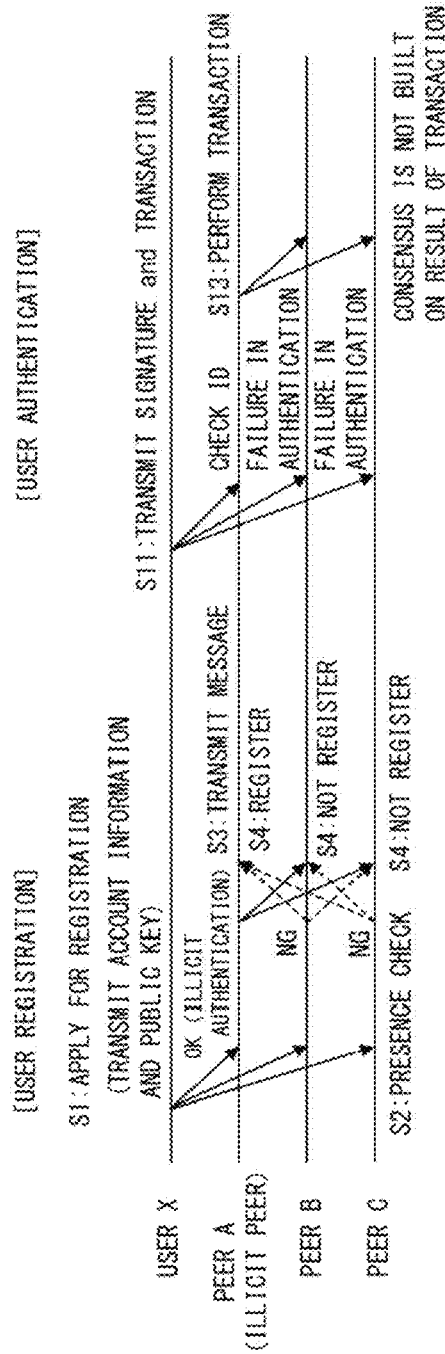
FIG. 9 illustrates an example of a sequence for a case in which user authentication fails.

FIG. 9 illustrates an example of a sequence for a case in which user authentication fails. In this example, a peer A is operated as an illicit authentication node. The user X attempts to participate in the communication system 100 in cooperation with the peer A.

In S1, the user X transmits application-for-registration information to peers A-C. However, the account information includes incorrect information.

In S2-S3, each of the peers A-C performs a presence check for the user X. Since the account information includes incorrect information, the presence checks performed by the peers B and C fail. Accordingly, the peers B and C respectively transmit a message indicating that the account information is incorrect to the other peers. Meanwhile, although the account information is incorrect, the peer A transmits a message indicating that the account information is correct to the peers B and C.

In S4, each of the peers A-C decides according to consensus policies whether to register the user X. In this example, only one inspection result indicates that the account information is correct. Accordingly, neither of the peers B and C register the user X. Meanwhile, the peer A illicitly registers the user X, although the inspection result does not satisfy the consensus policies.

In S11, the user X transmits an electronic signature and a transaction to the peers A-C. In S12, each of the peers A-C inspects the electronic signature received from the user X. The peer A has registered the user X. Hence, in S13, the peer A performs the transaction received from the user X. By contrast, neither of the peers B and C have registered the user X. Hence, neither of the peers B and C perform the transaction received from the user X.

As described above, the transaction transmitted from the user X is performed by the peer A but is not performed by the other peers. Hence, a consensus is not built on a result of performing the transaction, and the result of performing the transaction is not settled. Thus, the transaction transmitted from the illicit user is prevented from being performed.

FIG. 10 is a flowchart indicating an example of a user registration process performed by each peer. The processes of this flowchart are performed by each of the peers A-C in the example depicted in FIGS. 2-4. The following description is based on the assumption that a communication device provided for each node performs the user registration process.

In S21, the communication device waits for an application for registration from a new user. When an application for registration is received, an inspection is performed in S22-S23 as to whether account information of the new user is correct. For example, the processes of S22-S23 may be performed by a human. In this case, the inspection result is supplied to the communication device.

When the account information is correct, the communication device transmits a message indicating approval of registration to the other nodes in S24. In this case, the communication device may transmit, to the other communication devices, a publication key of the new user to which an electronic signature has been attached, together with the message. When the account information is incorrect, the communication device transmits a message indicating disapproval of registration to the other nodes in S25. The messages transmitted in S24-S25 correspond to the inspection results depicted in FIG. 3. In S26, the communication device waits for a message to be transmitted from other communication devices.

When a specified number of messages or more have been received, the communication device decides in S27 whether to register a new user. The specified number indicates a sufficient number to decide whether to register a new user. Whether to register a new user depends on consensus policies determined in advance. When registering the new user, the communication device registers the public key of the new user in the public key list of this communication device in S28.

Figure 11:
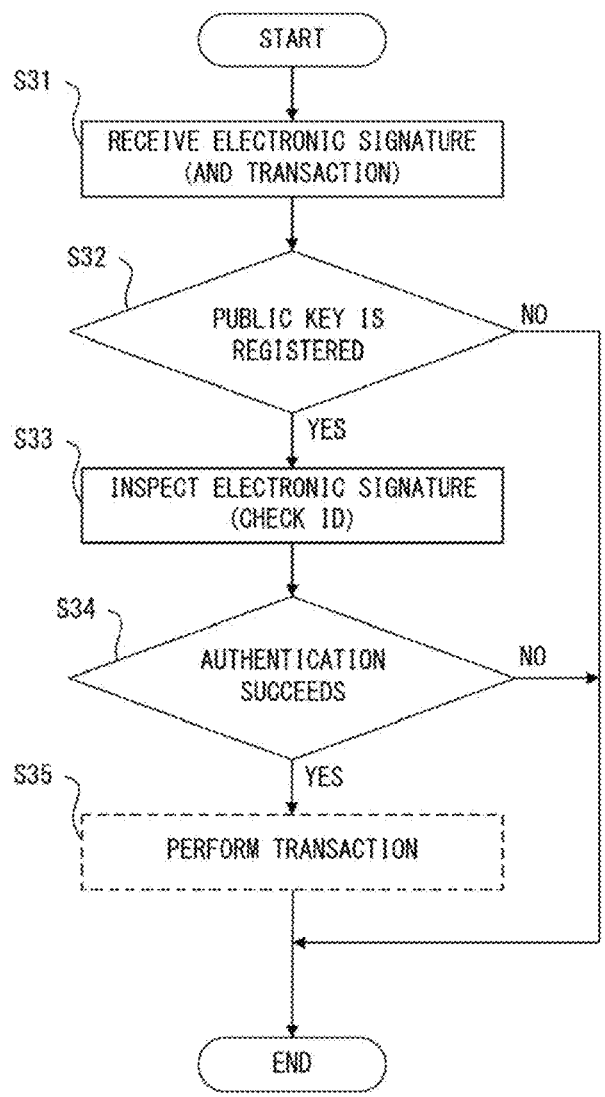
FIG. 11 is a flowchart indicating an example of a user authentication process.

FIG. 11 is a flowchart indicating an example of a user authentication process performed by each peer. The following description is based on the assumption that a user X transmits an electronic signature and a transaction to each communication device.

In S31, the communication device receives an electronic signature and a transaction from the user X. In S32, the communication device decides whether the public key of the source of the electronic signature (i.e., user X) is registered in the public key list of this communication device.

When the public key of the user X is registered in the public key list, the communication device inspects the received electronic signature with the public key of the user X in S33-S34. When the inspection of the electronic signature succeeds, the communication device performs, in S35, the transaction received from the user X. When the public key of the user X is not registered in the public key list or when the inspection of the electronic signature fails, the communication device does not perform the transaction received from the user X.

Figure 12:
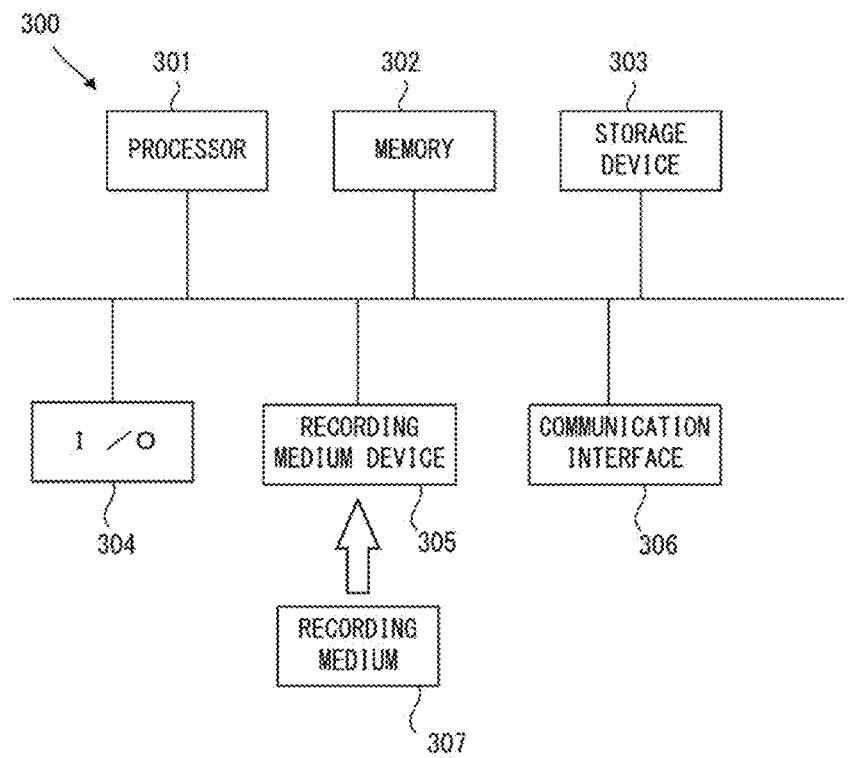
FIG. 12 illustrates an example of the hardware configuration of a computer implemented in each node.

FIG. 12 illustrates an example of the hardware configuration of a computer implemented in each node. A computer 300 includes a processor 301, a memory 302, a storage device 303, an I/O device 304, a recording medium device 305, and a communication interface 306. Each peer may be implemented by the computer depicted in FIG. 12.

The processor 301 may realize user registration and user authentication by executing a communication program stored in the storage device 303. To perform the user registration, the processor 301 executes a communication program describing the processes of the flowchart depicted in FIG. 10. To perform the user authentication, the processor 301 executes a communication program describing the processes of the flowchart depicted in FIG. 11.

The memory 302 is, for example, a semiconductor memory and used as a work area for the processor 301. The storage device 303 may be implemented in the computer 300 or may be connected to the computer 300. A public key list is stored in the memory 302 or the storage device 303. The I/O device 304 accepts input of an instruction from a user or a network administrator. The I/O device 304 may output a result of processing performed by the processor 301. The recording medium device 305 reads a signal recorded in a removable recording medium 307. The above-described communication programs may be recorded in the removable recording medium 307. The communication interface 306 provides an interface for a connection to a network.

Although not illustrated in the drawings so as to simplify the descriptions, when the user X is allowed to participate in the communication system 100, the public keys of the users A-C and the user X are registered in the public key list of the node (peer) of the user X. The user X may work as one of the authentication stations when the users of the peers A-C communicate.

Another Embodiment

Figure 13:
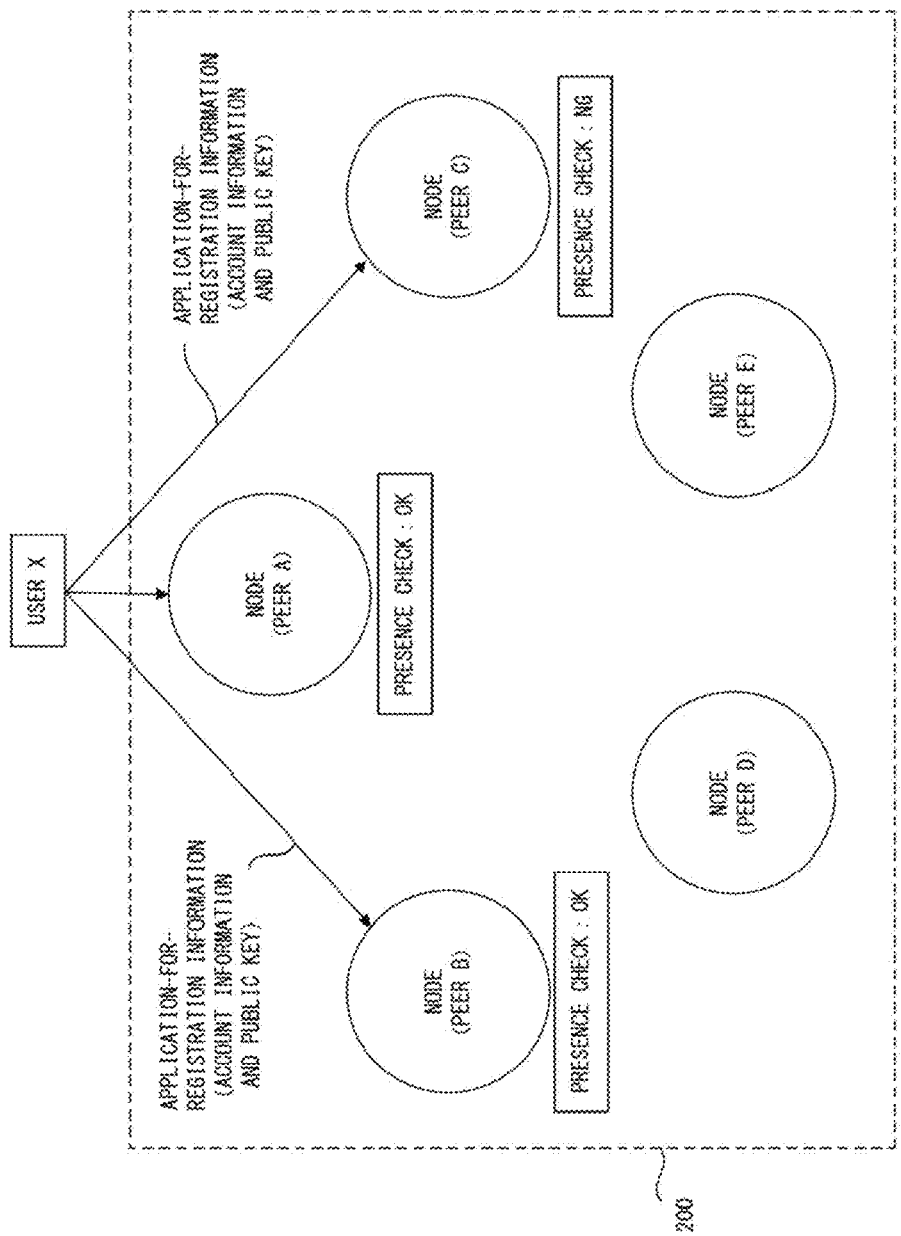
FIGS. 13 and 14 illustrate an example of a user registration procedure in accordance with another embodiment.
Figure 14:
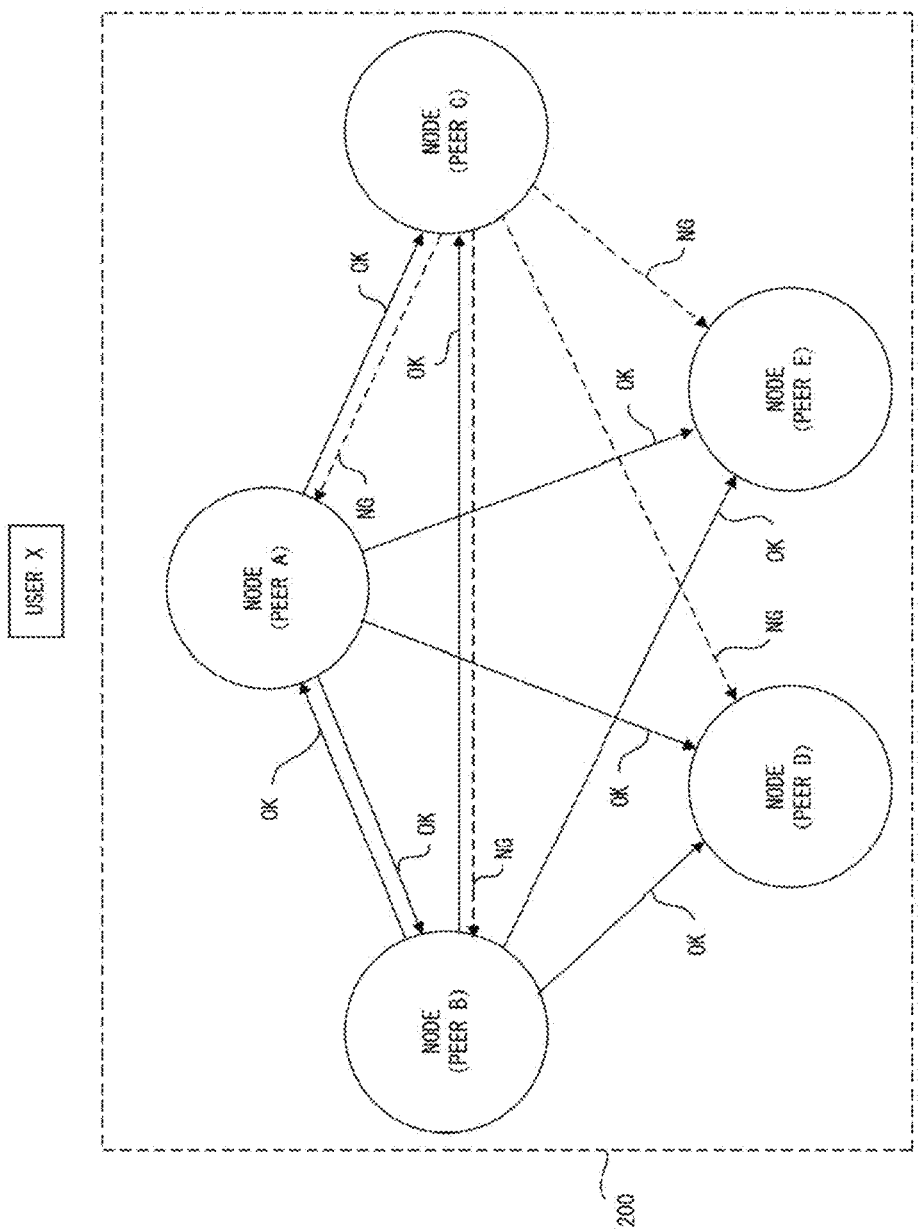

FIGS. 13 and 14 illustrate an example of a user registration procedure in accordance with another embodiment of the present invention. In this example, a communication system 200 includes peers A-E. A user X requests permission to participate in the communication system 200, as in the example depicted in FIGS. 2-4.

In the example depicted in FIGS. 2-4, all peers that participate in the communication system 100 are operated as authentication nodes. In the embodiment depicted in FIGS. 13-14, by contrast, some of the peers that participate in the communication system 200 are operated as authentication nodes. In this example, peers A-C among peers A-E are operated as authentication nodes.

As depicted in FIG. 13, the user X transmits application-for-registration information to the peers A-C operated as authentication nodes. That is, application-for-registration information is transmitted from the user X to each of the peers A-C.

Upon receipt of the application-for-registration information from the new user (i.e., user X), each of the peers A-C is operated as an authentication node. Accordingly, each of the peers A-C performs a presence check. In particular, each of the peers A-C checks whether account information included in the received application-for-registration information is correct. In this example, the peers A and B respectively decide that the account information of the user X is correct, and the peer C decides that the account information of the user X is incorrect.

Each of the peers A-C transmits a message indicating an inspection result for the account information of the user X to all nodes. As described above, the inspection result indicates whether the account information of the user X is correct. An inspection result transmitted when account information is correct may hereinafter be referred to as a "registration OK message", and an inspection result transmitted when account information is incorrect may hereinafter be referred to as a "registration NG message".

The peer A transmits a registration OK message to the peers B, C, D, and E. The peer B transmits a registration OK message to the peers A, C, D, and E. The peer C transmits a registration NG message to the peers A, B, D, and E. In FIG. 14, solid arrows indicate transmission of a registration OK message, and dashed lines indicate transmission of a registration NG message.

When a peer decides that the account information of the user X is correct, the peer transmits a registration OK message and application-for-registration information of the user X (i.e., the account information and public key of the user X) to all nodes. In the example depicted in FIG. 14, the peers A and B respectively transmit a registration OK message and application-for-registration information of the user X to all nodes.

In this case, an electronic signature is attached to the application-for-registration information. For example, the peer A may calculate a hash value for the application-for-registration information and create an electronic signature by encrypting this hash value with the private key of the peer A. Then, the peer A attaches the electronic signature to the application-for-registration information and transmits the application-for-registration information with the attachment to all nodes. Similarly, the peer B attaches an electronic signature created using the private key of the peer B to the application-for-registration information and transmits the application-for-registration information with the attachment to all nodes.

In accordance with a consensus policy determined in advance, each of the peers A-E decides whether to allow the user X to participate in the communication system 200, as in the example depicted in FIGS. 2-4. In this example, a consensus policy that indicates "the user X is allowed to participate in the communication system 200 when two or more peers have decided that the account information of the user X is correct" is used.

The peer A has decided that the account information of the user X is correct. In addition, the peer A has received a registration OK message from the peer B. Accordingly, two peers have decided that the account information of the user X is correct. Hence, the peer A allows the user X to participate in the communication system 200 and registers the public key of the user X in the public key list of the peer A.

The peer B has decided that the account information of the user X is correct. In addition, the peer B has received a registration OK message from the peer A. Accordingly, two peers have decided that the account information of the user X is correct. Hence, the peer B also allows the user X to participate in the communication system 200 and registers the public key of the user X in the public key list of the peer B.

The peer C has decided that the account information of the user X is incorrect. However, the peer C has received registration OK messages from the peers A and B. Accordingly, two peers have decided that the account information of the user X is correct. Hence, the peer C also allows the user X to participate in the communication system 200 and registers the public key of the user X in the public key list of the peer C.

The peers D and E have respectively received registration OK messages from the peers A and B. Hence, the peers D and E respectively allow the user X to participate in the communication system 200. In this case, the peers D and E respectively check the application-for-registration information received from the peer A or B.

For example, the peer D may check the application-for-registration information received from the peer A. The electronic signature of the peer A has been attached to the application-for-registration information received from the peer A. The electronic signature of the peer A is created by encrypting the hash value of the application-for-registration information with the private key of the peer A. Accordingly, the peer D calculates the hash value of the received application-for-registration information. The peer D also decrypts the received electronic signature with the public key of the peer A. When the hash value of the application-for-registration information matches a result of decrypting the electronic signature, the peer D decides that the application-for-registration information received from the peer A has not been falsified.

Upon confirming that the application-for-registration information of the user X has not been falsified, each of the peers D and E registers the public key of the user X included in the application-for-registration information in the public key list of this peer. Accordingly, the public key of the user X is registered in the public key lists of the peers D and E.

In the example depicted in FIGS. 13-14, the peer C has decided that the account information of the user X is incorrect. Thus, the peer C may ignore the consensus policy and disallow participation of the user X in the communication system 200. In this case, the peer C rejects the request for authentication of the user X. However, in a system in which transactions are performed or settled according to a consensus between a plurality of participants (e.g., block chain network), even when the peer C denies authentication of the user X, a transaction that the user X has made a request to perform may be performed when many of the other peers have authenticated the user X.

Figure 15:
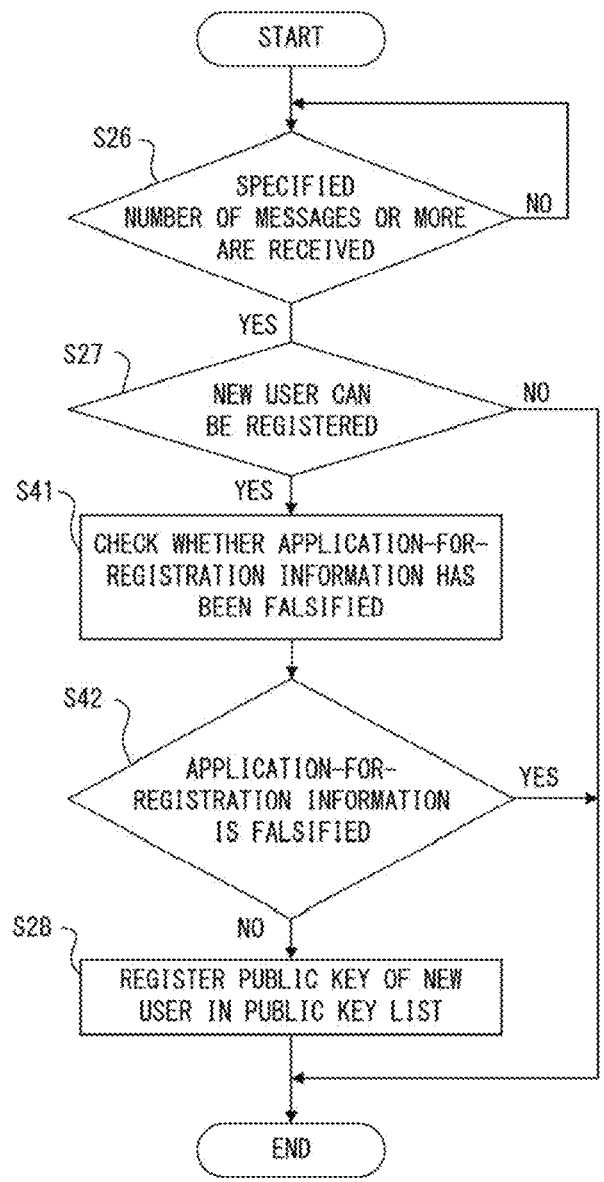
FIG. 15 is a flowchart indicating an example of a user registration process performed at a peer that is not operated as an authentication node.

FIG. 15 is a flowchart indicating an example of a user registration process performed at a peer that is not operated as an authentication node. In the example depicted in FIGS. 13-14, the processes of this flowchart are performed by the peers D and E.

A peer that is operated as an authentication node and a peer that is not operated as an authentication node perform substantially the same processes in S26-S27. In particular, a communication device that is not operated as an authentication node also decides whether to register a new user. In the meantime, a communication device that is operated as an authentication node transmits a registration OK message and application-for-registration information of the new user when deciding that account information of the new user is correct. An electronic signature has been attached to the application-for-registration information.

When deciding to register the new user, the communication device checks in S41-S42 whether the received application-for-request information has been falsified. When the received application-for-registration information has not been falsified, the communication device registers, in S28, the public key of the new user in the public key list of this communication device.

The user authentication is substantially the same as either of the procedures depicted in FIGS. 5 and 11. Accordingly, when the user X uses the communication system 200, the user X transmits an electronic signature to peers A-E. Each of the peers A-E inspects the electronic signature with the public key of the user X registered in the public key list of the peer. When the inspection of the electronic signature succeeds (i.e., the public key of the user X is registered in the public key list), a transaction that is requested from the user X will be performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a program for causing a processor to execute a communication process, the processor being implemented in one of a plurality of nodes that form a communication system, the communication process comprising:
   receiving account information of a user and a public key of the user from the user;
   transmitting a first message that indicates the account information is correct and the public key of the user to the plurality of nodes when it is decided that the account information is correct;
   transmitting a second message that indicates the account information is not correct to the plurality of nodes when it is decided that the account information is not correct,
   counting a total number of the first messages and the second messages received from other nodes in the plurality of nodes, and
   registering the public key of the user in a public key list that stores public keys of users who have been allowed to participate in the communication system, when the total number exceeds a specified threshold and the first message is a majority with respect to the second message.

2. A communication device provided for one of a plurality of nodes that form a communication system, the communication device comprising:
   a processor configured to
      receive account information of a user and a public key of the user from the user,
      transmit a first message that indicates the account information is correct and the public key of the user to the plurality of nodes when it is decided that the account information is correct, transmit a second message that indicates the account information is not correct to the plurality of nodes when it is decided that the account information is not correct, count a total number of the first messages and the second messages received from other nodes in the plurality of nodes, and register the public key of the user in a public key list that stores public keys of users who have been allowed to participate in the communication system, when the total number exceeds a specified threshold and the first message is a majority with respect to the second message.

3. A communication method that is used in a communication system that includes a plurality of nodes, wherein two or more authentication nodes among the plurality of nodes respectively receive account information of a user and a public key of the user from the user, the two or more authentication nodes respectively transmit a first message that indicates the account information is correct and the public key of the user to the plurality of nodes when it is decided that the account information is correct, the two or more authentication nodes respectively transmit a second message that indicates the account information is not correct to the plurality of nodes when it is decided that the account information is not correct, each of the plurality of nodes counts a total number of the first messages and the second messages received from the two or more authentication nodes, and each of the plurality of nodes registers the public key of the user in a public key list that stores public keys of users who have been allowed to participate in the communication system, when the total number exceeds a specified threshold and the first message is a majority with respect to the second message.

4. The communication method according to claim 3, wherein each of the authentication nodes creates, for the public key of the user, an electronic signature by using a private key of the authentication node when it is decided that the account information is correct, and transmits a message indicating that the account information is correct, the public key of the user, and the electronic signature to the plurality of nodes.

5. The communication method according to claim 3, wherein each of the authentication nodes creates, for the account information and the public key of the user, an electronic signature by using a private key of the authentication node when it is decided that the account information is correct, and transmits a message indicating that the account information is correct, the account information, the public key of the user, and the electronic signature to the plurality of nodes.

6. The communication method according to claim 4, wherein each of the plurality of nodes other than the authentication nodes inspects the electronic signature with a public key of a node that is a source of the electronic signature, and registers the public key of the user in the public key list after confirming that the public key of the user has not been falsified.

7. The communication method according to claim 3, wherein each of the nodes when an electronic signature created using a private key of the user is received from the user, inspects the electronic signature by using the public key of the user registered in the public key list, and authenticates the user when the electronic signature is confirmed.

8. A communication method that is used by each of a plurality of nodes in a communication system, the communication method comprising:

receiving account information of a user and a public key of the user from the user;

transmitting a first message that indicates the account information is correct to all of the other nodes when it is decided that the account information is correct;

transmitting a second message that indicates the account information is not correct to the plurality of nodes when it is decided that the account information is not correct, counting a total number of the first messages and the second messages received from other nodes in the plurality of nodes, and registering the public key of the user in a public key list that stores public keys of users who have been allowed to participate in the communication system, when the total number exceeds a specified threshold and the first message is a majority with respect to the second message.

* * * * *